H. C. HEFFNER.
COMBINED VEGETABLE PARER, SLICER, &c.
APPLICATION FILED JAN. 3, 1917.
1,367,876.
Patented Feb. 8, 1921.
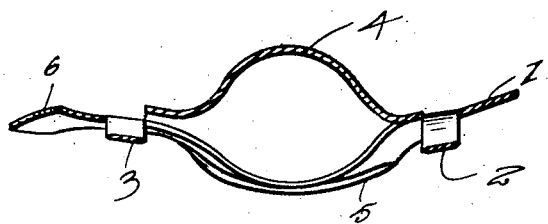
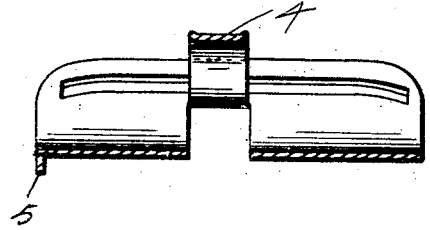
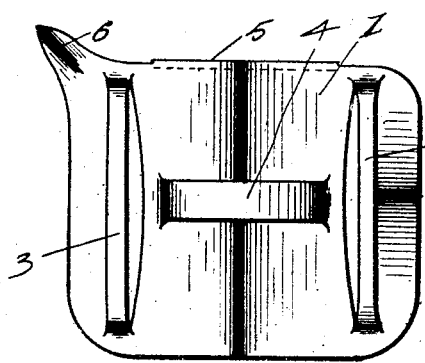
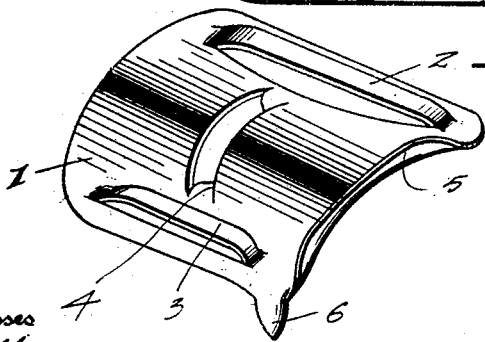
Witnesses
Inventor
H.C. Heffner
By
Attorney

UNITED STATES PATENT OFFICE.

HENRY C. HEFFNER, OF BRADFORD, PENNSYLVANIA.

COMBINED VEGETABLE PARER, SLICER, &c.

1,367,876.  Specification of Letters Patent.  Patented Feb. 8, 1921.

Application filed January 3, 1917. Serial No. 140,433.

*To all whom it may concern:*

Be it known that I, HENRY CLAY HEFFNER, a citizen of the United States, residing at Bradford, in the county of McKean and State of Pennsylvania, have invented certain new and useful Improvements in Combined Vegetable Parers, Slicers, &c.; and I do hereby declare the following to be a full, clear, and exact description of the invention, such as will enable others skilled in the art to which it appertains to make and use the same.

The object of this invention is the provision of a simple, cheap, and efficient implement for pealing, slicing or scraping vegetables, the said implement being of such construction that the same can be stamped from a single piece of metal.

Other objects will appear and be better understood from that embodiment of my invention of which the following is a specification, reference being had to the accompanying drawing forming a part thereof, in which:

Figure 1 is a longitudinal sectional view, taken through the implement,

Fig. 2 is a transverse section taken through the implement,

Fig. 3 is a top plan view thereof, and

Fig. 4 is a bottom plan view of the implement.

Referring to the drawing in detail, wherein similar reference numerals designate corresponding parts throughout the several views, the implement is shown as consisting of a plate 1, which is of curved or arcuate shape. Stamped or struck from the plate 1, adjacent, respectively, the opposite side edges thereof is a slicing blade 2 and a paring blade 3. The blades 2 and 3 underlie, in spaced relation, the convexed side or face of the plate, and each has the longitudinal edges thereof beveled to provide cutting edges. The paring blade 3 lies nearer the plate 1 than the blade 2, so as to prevent the blade 3 cutting too deep into the vegetable during the paring operation. An arcuate-shaped retaining element 4 is struck up from the concaved face of the plate 1, and provides a loop for receiving, preferably, the middle finger of the hand of the operator. The forward edge of the plate 1 is provided with a depending flange 5, which has its lower edge sharpened, and the said flange 5 provides a scraper for scraping the vegetable after the same has been pared, or scraping the skins from potatoes.

One of the ends of that edge of the plate 1 that has the scraper 5 formed thereon, is provided with a pointed finger 6, adapted to be employed for removing the cores of fruit or the eyes from potatoes.

From the foregoing description it will be seen that I have provided a simple and inexpensive implement that will admit of fruits or vegetables being pared or scraped, and sliced, in a convenient and expeditious manner.

Having thus described my invention what I claim as new, is:

A vegetable parer and slicer comprising a metallic sheet having approximately parallel side edges, a section of the sheet at the intermediate portion thereof being struck up from the body of the sheet and disposed transversely thereof and adapted to serve as a handle. sections of the sheet beyond the ends of the said handle section being struck up from the sheet and disposed at the opposite face thereof from that face at which the handle section is disposed, the last mentioned sections adapted to serve as cutting blades, one of the last mentioned sections having its intermediate portion spaced from the adjacent surface of the sheet for a distance greater than the intermediate portion of the other of the last mentioned sections, the sheet being curved and the said curvature extending longitudinally of the handle section and transversely of the blade sections, there being provided between the handle section and the intermediate portion of the sheet sufficient space for the reception of the hand of an operator.

In testimony whereof I affix my signature in presence of two witnesses.

HENRY C. HEFFNER.

Witnesses:
TRACY RIDER,
F. F. CONNERLY.